(No Model.)

J. CONNOR.
PIPE COUPLING.

No. 476,188. Patented May 31, 1892.

WITNESSES:
P. F. Hagle
Wm. C. Wiedersheim.

INVENTOR
Joseph Connor.
BY John A. Wiedersheim
ATTORNEY.

UNITED STATES PATENT OFFICE.

JOSEPH CONNOR, OF PHILADELPHIA, PENNSYLVANIA, ASSIGNOR OF ONE-HALF TO ALLEN J. FULLER, OF SAME PLACE.

PIPE-COUPLING.

SPECIFICATION forming part of Letters Patent No. 476,188, dated May 31, 1892.

Application filed June 24, 1891. Serial No. 397,290. (No model.)

*To all whom it may concern:*

Be it known that I, JOSEPH CONNOR, a citizen of the United States, residing in the city and county of Philadelphia, State of Pennsylvania, have invented a new and useful Improvement in Pipe-Couplings, which improvement is fully set forth in the following specification and accompanying drawings.

My invention consists of a pipe-coupling formed of flanged collars and a clamping sleeve and nut, as will be hereinafter described.

It also consists in adapting a pipe-coupling to permit the application and removal of the packing of the coupling from the exterior thereof.

Figure 1:
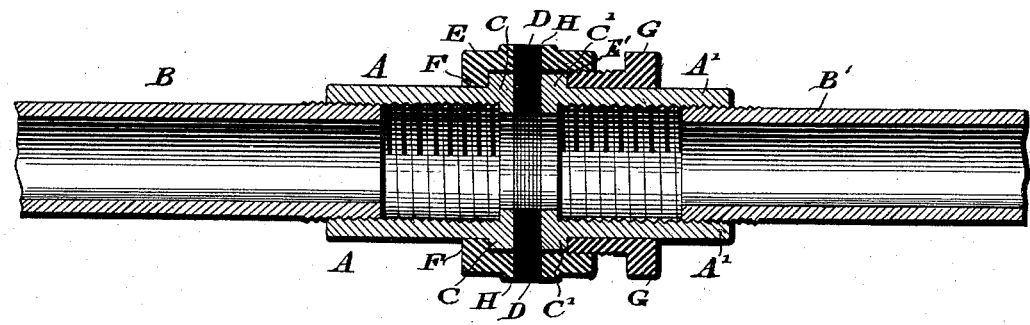
Figure 2:
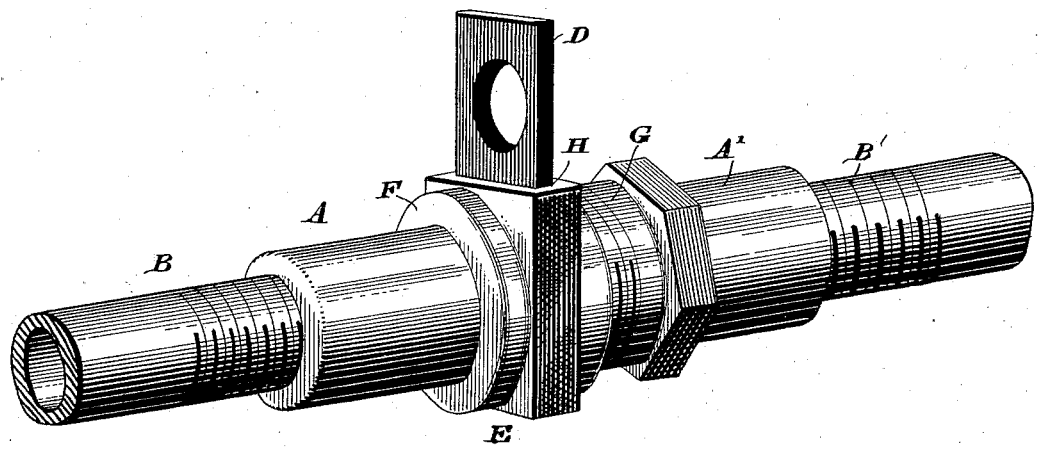

Figure 1 represents a longitudinal section of a pipe-coupling embodying my invention. Fig. 2 represents a perspective view thereof, the packing being shown partly removed.

Similar letters of reference indicate corresponding parts in the two figures.

Referring to the drawings, A A' designate two collars, to the outer ends of which are attached the pipes B B. On the inner ends of said collars, on the exterior thereof, are shoulders C C', respectively, and between said inner ends is the packing D for forming a tight joint thereat.

E designates a sleeve having at one end the inwardly-projecting flange F, which is adapted to engage with the shoulder C. The other end of said sleeve is interiorly threaded, as at E, for the engagement of an exteriorly-threaded nut G, which freely encircles the collar.

It will be seen that when the parts are in position, as in Fig. 1, the nut G is properly rotated, whereby it presses against the collar C' and draws the sleeve E in such manner that the flange F thereof presses against the flange C of the collar A. By this provision the two collars are forced toward each other and the packing is accordingly compressed between the same, forming a tight joint between the same.

The collars A A' are of such length that portions of the same are outside of the sleeve E and the nut G, whereby should there be a leak in the joint between either of the collars and the pipe connected therewith the nut G is unscrewed, so as to loosen the sleeve E, after which the outside portion of the respective collar may be grasped by a pipe tongs, clamp, wrench, &c., so as to rotate said collar and screw the same to a greater extent upon the pipe, thus tightening the joint in question.

In order to provide access to the packing D from the exterior of the coupling, a passage or opening H is formed in the sleeve E at a place coincident with the space between the two collars, said passage extending entirely through the wall of the sleeve, whereby the packing may be passed through the opening in the sleeve and thereby located between the two collars and removed when required through said opening without uncoupling the pipes, the nut G in this case being only partly unscrewed to release the sleeve and relieve the pressure on the packing, the apparently-displaced portion of the packing being shown in Fig. 2, it being noticed that said packing is sufficiently long to occupy the passage in the sleeve when in operation, as shown in Fig. 1, where, as it will be seen, the inner end of the nut does not contact with the packing, while the collars exert direct pressure thereagainst. Consequently no rotary motion is imparted to the packing in coupling or uncoupling the pipes, and thus tearing, twisting, or otherwise injuring the packing during such actions is obviated, as is evident.

Having thus described my invention, what I claim as new, and desire to secure by Letters Patent, is—

1. The opposite collars A A', with outwardly-projecting shoulders C C' on the inner ends thereof, the sleeve E, having at one end the inwardly-projecting flange F, which engages with the shoulder C of the collar A, and at the other end the interior screw-threads E', and the nut G, which abuts against the shoulder C' of said collar A' and is interposed between the sleeve E and said collar A' and engages with the threads of said sleeve E, said nut encircling the collar A', said sleeve E having a passage H coincident with the space between the two collars, the parts being combined substantially as described, forming an improvement in couplings, as stated.

2. In a coupling, a sleeve abutting against the shoulder of one collar, in combination with an externally-threaded nut which abuts against the shoulder of the opposite collar and is interposed between said sleeve and second-named collar and is rotatable upon the latter and secured to said sleeve, said sleeve having a passage coincident with the space between the two collars, substantially as and for the purpose set forth.

3. The collars A A', having flanges C C' on their inner ends and separated at the flanges, and the packing D between said flanges, in combination with the sleeve E, which encircles the flanges C C', and the nut G, which encircles the collar A' and engages with the sleeve E, said sleeve having a passage H coincident with the space between the two collars, substantially as described.

4. In a pipe-coupling, two opposite collars, a sleeve encircling the same, formed with a passage open to the exterior, and a tightening-nut, in combination with packing, which occupies a position between the collars coincident with the passage in the sleeve, the flange of one collar being interposed between the packing and tightening-nut, substantially as described.

JOSEPH CONNOR.

Witnesses:
JOHN A. WIEDERSHEIM,
A. P. JENNINGS.